United States Patent [19]
Rekhter

[11] Patent Number: 5,917,820
[45] Date of Patent: Jun. 29, 1999

[54] EFFICIENT PACKET FORWARDING ARRANGEMENT FOR ROUTING PACKETS IN AN INTERNETWORK

[75] Inventor: Yakov Rekhter, Putnam Valley, N.Y.

[73] Assignee: Cisco Technology, Inc., San Jose, Calif.

[21] Appl. No.: 08/662,418

[22] Filed: Jun. 10, 1996

[51] Int. Cl.$^6$ .................................................. H04L 12/46
[52] U.S. Cl. ........................................ 370/392; 370/401
[58] Field of Search .................................... 370/255, 400, 370/401, 402, 403, 404, 405, 408, 392, 474

[56] References Cited

U.S. PATENT DOCUMENTS

| | | | |
|---|---|---|---|
| 5,243,342 | 9/1993 | Kattemalalavadi et al. | 341/106 |
| 5,353,283 | 10/1994 | Tsuchiya | 370/60 |
| 5,394,402 | 2/1995 | Ross | 370/94.1 |
| 5,426,637 | 6/1995 | Derby et al. | 370/85.13 |
| 5,452,294 | 9/1995 | Natarajan | 370/54 |
| 5,491,692 | 2/1996 | Gunner et al. | 370/85.13 |
| 5,500,860 | 3/1996 | Perlman et al. | 370/85.13 |
| 5,519,704 | 5/1996 | Farinacci et al. | 370/85.13 |
| 5,555,256 | 9/1996 | Calamvokis | 370/60.1 |
| 5,561,669 | 10/1996 | Lenney et al. | 370/60.1 |
| 5,623,492 | 4/1997 | Teraslinna | 370/397 |
| 5,650,993 | 7/1997 | Lakshman et al. | 370/236 |
| 5,651,002 | 7/1997 | Van Seters et al. | 370/392 |

OTHER PUBLICATIONS

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route–Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

(List continued on next page.)

*Primary Examiner*—Min Jung
*Attorney, Agent, or Firm*—Cesari and McKenna, LLP

[57] ABSTRACT

An improved packet forwarding arrangement for making quick and efficient next hop determinations through the creation and exchange of router-unique tags used as an index into a novel database of route information. The improved packet forwarding system operates independently of connectionless network layer protocols currently exiting in the router, utilizing an independent tag exchange protocol to advertise the locally-unique tags to neighboring routers, and a packet data link header to carry the tags. Central to the packet forwarding system is a fast look-up tag database (TDB) containing a locally-unique tag and one or more remote tags local to neighboring routers, all of which are associated with predetermined groups of destination addresses such as destination address prefixes. The table look-up data structure of the TDB as well as the small, fixed-length tags of the present invention enable the packet forwarding system to quickly and efficiently index through the TDB to obtain the necessary information to make next hop determinations, thereby significantly reducing the overhead associated with packet forwarding. An existing forwarding information database (FIDB) modified to include the same tags is also provided for communicating with nodes not supporting the present invention.

19 Claims, 7 Drawing Sheets

OTHER PUBLICATIONS

"Digital Subscriber Signalling System No. 1 (DSS 1)—Signalling Specification for Frame Mode Basic Call Control," ITU–T Recommendation Q.933, International Telecommunication Union, Geneva, 1994.

G. P. Chandranmenon and G. Varghese, "Trading Packet Headers for Packet Processing," Proc. ACM SIGCOMM '95, Boston, MA, Sep. 1995, pp. 162–173.

Network Working Group, Request for Comments: 1476, R. Ullmann, Rap:Internet Route Access Protocol (20 pages), Jun. 1993.

Network Working Group, Request for Comments: 1707, M. McGovern, et al., Catnip: Common Architecture for the Internet, (16 pages), Oct. 1994.

Network Working Group, Request for Comments: 1883, S. Deering, et al., Internet Protocol, Version 6, (37 pages), Dec. 1995.

Network Working Group, Request for Comments: 1953, P. Newman et al., Ipsilon Flow Management Protocol Specification for IPV4 (20 pages), May 1996.

International Standard ISO/IEC, Oct. 1, 1994, Information Technology–Telecommunications and Information Exchange Between Systems—Protocol for Exchange of Inter–Domain Routeing Information Among Intermediate Systems to Support Forwarding of ISO 8473 PDU's.

International Standard ISO/IEC, Oct. 1, 1995 Amendment 1.

EFFICIENT PACKET FORWARDING ARRANGEMENT FOR ROUTING PACKETS IN AN INTERNETWORK

CROSS-REFERENCE TO RELATED APPLICATION

This invention is related to copending U.S. patent application Ser. No. 08/686,106 titled, *Arrangement for Rendering Forwarding Decisions for Packets Transferred Among Network Switches*, filed on Jul. 24, 1996 and assigned to the assignee of the present invention.

1. Field of the Invention

The present invention relates generally to computer networks and, more particularly, to routing packets in an internetwork.

2. Background of the Invention

Figure 1:
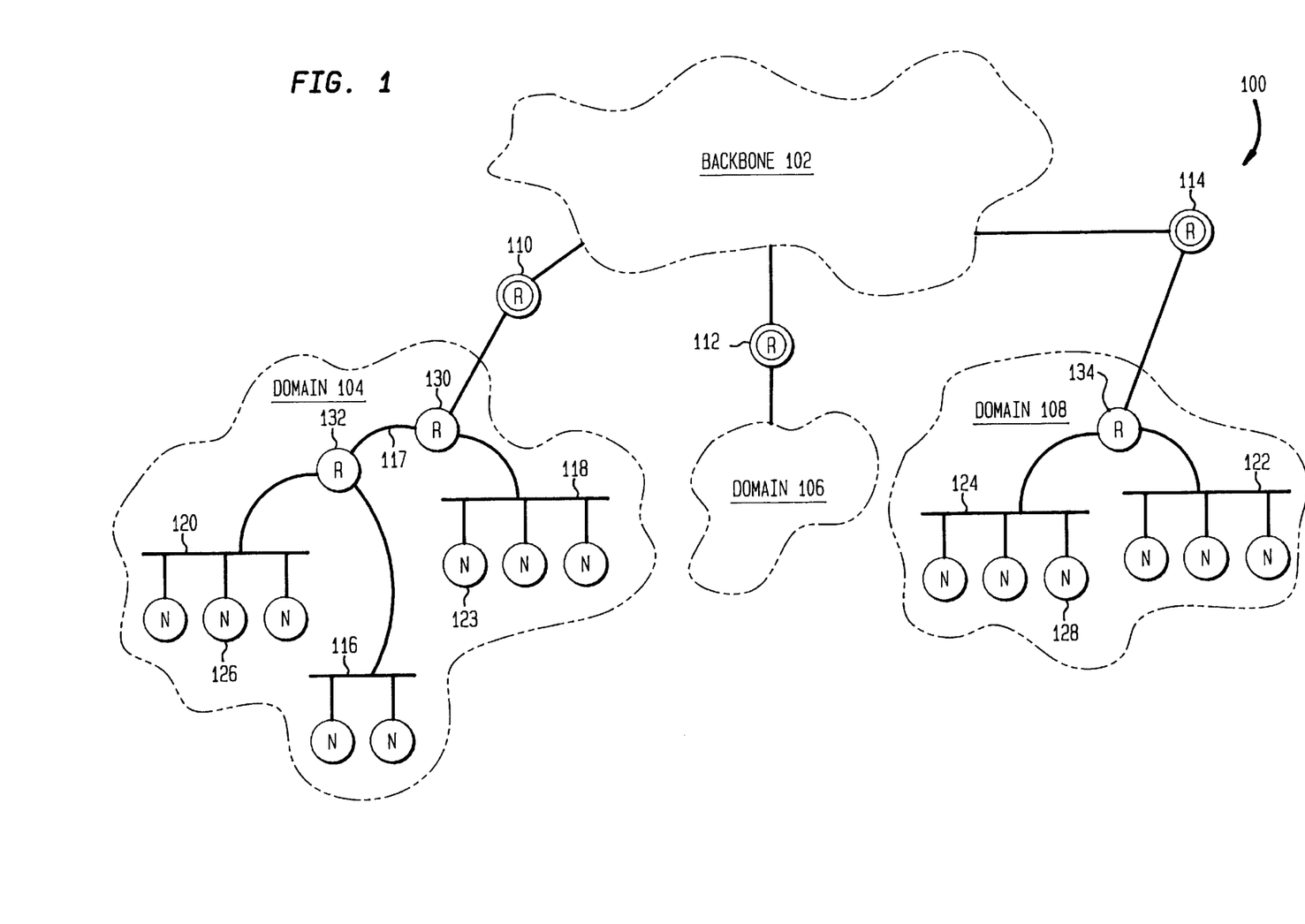
FIG. 1 is a block diagram of a computer internetwork including a collection of domains having one or more local networks.

Internetworking is the process of establishing and maintaining communications between and transferring data among multiple local networks in a distributed network system. FIG. 1 depicts an exemplary embodiment of an internetwork system 100, comprising a plurality of routing domains 104–108 coupled to a backbone network 102. In the hierarchically-arranged distributed internetwork system 100, backbone 102 is the top-level, or central, connection path shared by the nodes and networks connected to it. The backbone manages the bulk of the traffic between communicating nodes to provide end-to-end service between one user (i.e., a source node) and another user (i.e., a destination node). Each routing domain in the internetwork is a collection of one or more local networks that are attached to the backbone through one or more routers. Routing domains (a term used by the International Organization for Standardization, or ISO) are also referred to as customer networks or autonomous systems (a term used by the Internet community and used in the Internet Protocol Suite, or IP).

The local networks in a routing domain may be, for example, local area networks (LAN), metropolitan area networks (MAN), wide area networks (WAN), etc., all of which are attached to the backbone 102 through routers. In the following discussion, the term "local network" shall be used to refer to all types of networks that may be included in a domain. For example, domain 104 includes local networks 116, 118 and 120. A local network is depicted as a bold line to which stations can be attached. If a station, or end node, attaches to the bold line, it can transmit packets to, and receive packets from, every other station attached to that same bold line. The source and destination nodes are, typically, computers (workstations and servers) but may be any type of device that can include a network interface card (NIC), such as a printer or modem.

The routers within a routing domain manage communications among local networks within their domain and communicate with each other using an intradomain routing protocol (an ISO term; IP using the term Interior Gateway Protocol, or IGP). Examples of such protocols are the IP Routing Information Protocol (RIP; RFC 1058) routing protocol and the ISO Integrated Intermediate System-to-Intermediate System (IS—IS; DP 10589) routing protocol.

Domains 104–108 are connected to the backbone 102 through router nodes 110, 112 and 114, respectively. The routing protocols implemented in such routers are referred to as interdomain routing protocols (an ISO term; IP using the term exterior gateway protocols or EGP). An example of an ISO interdomain routing protocol is the Interdomain Routing Protocol (IDRP), wherein in IP, there is the Exterior Gateway Protocol (EGP) and the Border Gateway Protocol (BGP; RFC 1105) routing protocols. Although not shown here, more than one interdomain router may be used to connect a domain to the backbone; this configuration is often encouraged for redundancy purposes.

Thus, the hierarchically-arranged distributed internetwork system 100 contains levels of subnetworks, each having an associated routing level. The lower routing level includes intradomain routers 130–134 which manage individual links and nodes within their respective domains. The higher routing level includes interdomain routers 110–114 which manage all the lower-level domains without addressing details internal to lower routing levels. Communications among these routers typically comprises an exchange (i.e., advertise of) routing information. This exchange occurs between routers at the same routing level (referred to as peer routers) as well as between routers at different routing levels.

In order to reduce design complexity, most networks are organized as a series of hardware and software levels or "layers" within each node. These layers interact to format data for transfer between, for example, a source node and a destination node communicating over the network. Specifically, predetermined services are performed on the data as it passes through each layer and the layers communicate with each other by means of predefined protocols. This layered design permits each layer to offer selected services to other layers using a standardized interface that shields those layers from the actual implementation details of the services.

In an attempt to standardize network architectures, that is, the sets of layers and protocols used within a network, a generalized model has been proposed by the ISO. The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

Figure 2:
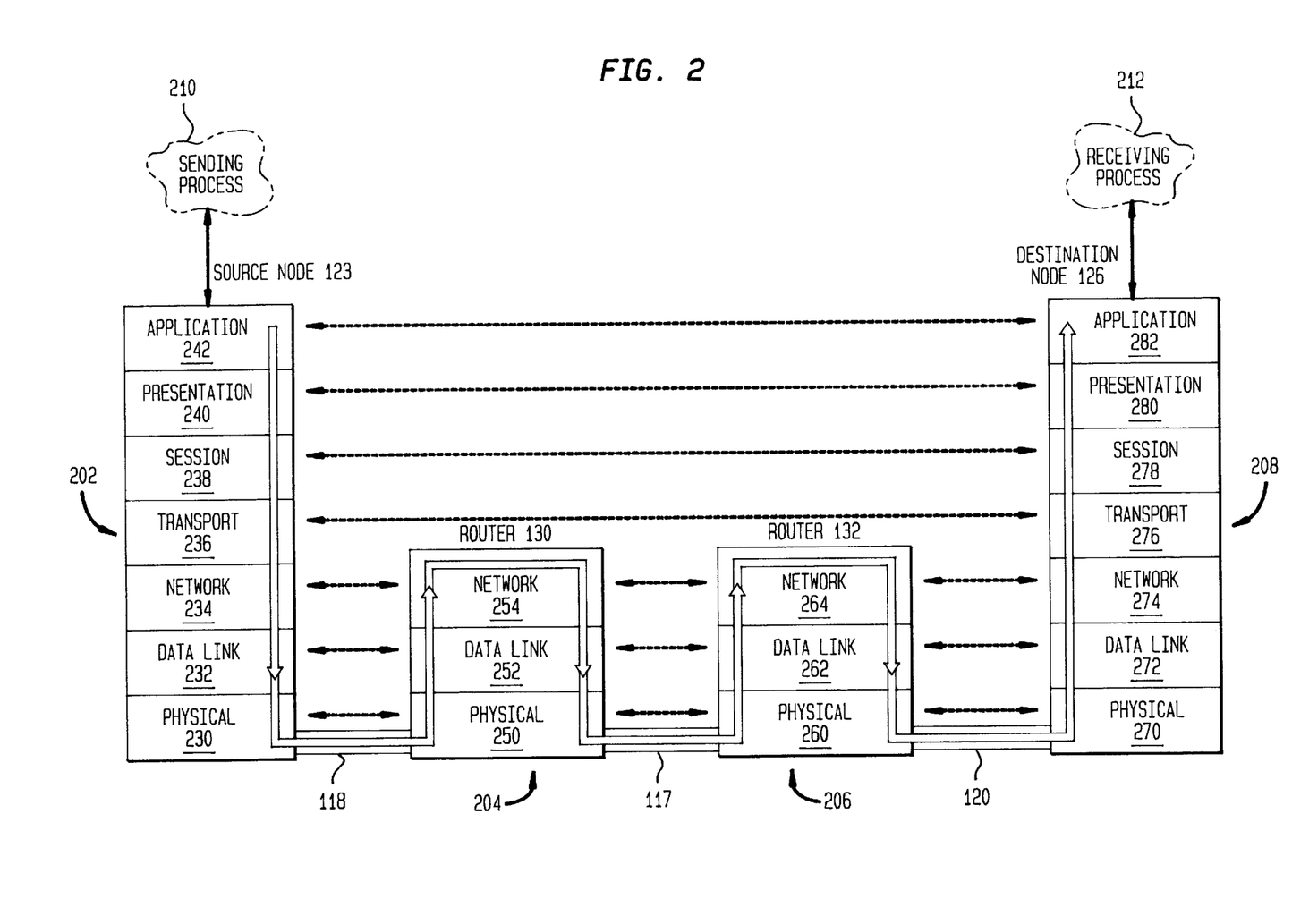
FIG. 2 is a schematic block diagram of prior art protocol stacks used to transmit data between a source node and a destination node of a computer network.

FIG. 2 is a schematic block diagram of OSI protocol stacks 202–208 used to transmit data between, for example, a source node 123 and a destination node 126 through routers 130 and 132, all of which are elements of internetwork 100. Each protocol stack is structured according to the OSI reference model; accordingly, each stack comprises a collection of protocols, one per layer. The routers utilize the lower three OSI layers, known as the subnet layers, to forward data packets to the next router or destination end node (referred to as the "next hop"). As can be seen, the protocol stacks 202–208 are physically connected through communications channels 118 at physical layers 230–250; 117 at physical layers 250–260; and 120 at physical layers 260–270. Data flow is schematically illustrated by solid arrows. For ease of description, the protocol stack 202 will be described.

Broadly stated, the physical layer 230 transmits a raw data bit stream over a communication channel 118, while the data link layer 232 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The data link layer 232 also ensures orderly coordination of the use of shared media, and handles addressing when multiple systems are reachable. It is common for different links of an internetwork or domain to implement different data link layers and for a router to implement several data link layer protocols, one to support each of the different types of links to which the node is attached.

The network layer 234 enables any pair of systems in the network, such as source node 123 and destination node 126, to communicate with is each other. A "fully connected" network is one in which every pair of nodes has a direct link between them; however, such a topology does not scale beyond a small number of nodes. Thus, the network layers generally must select one of many alternative paths through the physical network to find an optimal path through a series of connected nodes to route the data packets from the source to destination node.

The transport layer 236 establishes a reliable communications stream between a pair of communicating nodes. The transport layer 236 accepts the datastream from the session layer 238, apportions it into smaller units (if necessary), passes the smaller units to the network layer 234 and provides appropriate mechanisms to ensure that all the units arrive correctly at the destination node.

The session layer 238 establishes data transfer "sessions" between software processes on the source and destination nodes, along with management of such sessions in an orderly fashion. That is, a session not only allows ordinary data transport between the nodes, but it also provides enhanced services in some applications.

The presentation layer 240 performs frequently-requested functions relating to the presentation of transmitted data, including encoding of data into standard formats, while the application layer 242 contains a variety of protocols that are commonly needed by processes executing on the nodes.

Data transmission over the internetwork 100 therefore consists of generating data in, for example, a sending process 210 executing on the source node 123, passing that data to the application layer 242 and down through the layers of the protocol stack 202, where the data are sequentially formatted as a packet for delivery onto the channel 118 as bits. Those packet bits are then transmitted to the protocol stacks 204 and 206 of the routers 130 and 132, respectively, and finally to stack 208 of the destination node 126, where they are passed up that stack to a receiving process 212.

Although actual data transmission occurs vertically through the stacks, each layer is programmed as though such transmission were horizontal. That is, each layer in the source node 123 is programmed to transmit data to its corresponding or peer layer in the destination node 126, as schematically shown by dashed arrows in FIG. 2. To achieve this effect, each layer of the protocol stack 202 in the source node 123 typically adds information (in the form of a header field) to the data packet generated by the sending process as the packet descends the stack. At the destination node 126, the various headers are stripped off one-by-one as the packet propagates up the layers of protocol stack 208 until it arrives at the receiving process 212.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient communication performance. For this case, a fully connectionless service is desirable where each transmitted packet carries the full address of its destination through the network.

Connectionless network services are generally implemented in network layer protocols that perform basic connectionless service, neighbor greeting and routing functions. The basic connectionless service functions are primarily concerned with data packet formatting and end node status notification (e.g., error messages). The neighbor greeting function enables end nodes to determine which routers are available on their local network while enabling routers to determine their end node neighbors. In IP, the neighbor greeting protocol is defined in the Address Resolution Protocol (ARP; RFC 826); in ISO, the End System-to-Intermediate System protocol (ES-IS; ISO 9542).

The routing portion of the network layer protocol concerns the algorithms and protocols that routers implement to cooperate with each other to determine paths through the internetwork. Examples of connectionless network layer protocols are the ISO Connectionless Network Layer Protocol (CLNP), the Internet (IP) network layer protocol and the Internetwork Packet Exchange (IPX). As noted, each protocol stack layer of a transmitting node adds information in the form of a header field to the data packet generated by the sending process as the packet descends the protocol stack. The header fields defined by the network layer services are generally the same primarily because the same information are typically contained in each packet. For example, these headers typically contain fixed-length, hierarchical network layer addresses configured to accommodate relatively large numbers of nodes, local networks and domains of an internetwork.

The destination address is used by the network layer protocols to determine the route of the packet. When a packet is received at the network layer, that layer examines the network layer header of the packet, determines the next hop that the packet should take based upon the destination address, appends a new network layer header onto the packet as necessary, and passes the modified packet to the data link layer responsible for the outgoing link associated with the next hop.

Since network layer addresses are hierarchical in nature, network layer protocols that perform routing functions at the same routing level of an internetwork make next hop determination based upon the same portion of the destination address referred to as the destination address prefix. The routing information exchanged by peer routers typically includes this destination address prefix.

In conventional routers, these destination address prefixes are stored is in a forwarding information database having a conventional "Trie" data structure. To determine the next hop, network layer protocols implement a longest-matching-address-prefix ("longest match") algorithm that searches the forwarding database for an entry corresponding to the destination address located in the network layer header. The data structure of the forwarding database comprises a large number of "branches" each representing a string of the hierarchical destination address fields. The branches of the database have different address field values and/or terminate with a different number of address fields. The longest match algorithm must traverse numerous branches during this address matching process to determine the next hop. Due to the hierarchical characteristics of destination addresses, there may be several destination address prefixes in the forwarding database that match at least a portion of a particular destination address. As a result, the longest address in the forwarding database must be found.

The time required to search the forwarding database is proportional to the average length of the destination address in the database. Destination addresses often have a significant number of bits, particularly in large, hierarchically-arranged internetworks. Due to the length of the destination addresses as well as the manner in which the longest match algorithm navigates the forwarding database, the address matching functions contribute significantly to the overhead associated with the packet forwarding process performed by network layer protocols, thereby is adversely affecting the router's efficiency.

What is needed, therefore, is an efficient and accurate means for forwarding packets through a router so as to provide quick and reliable communications among nodes of an internetwork.

SUMMARY OF THE INVENTION

The present invention comprises an improved packet forwarding arrangement for rendering fast and efficient routing, i.e., next hop decisions based upon unique local tags generated by routers of a network, and used as an index into a novel tag database to retrieve service access point (SAP) and next hop network layer addresses of the next hop node destined to receive a packet. The improved packet forwarding system operates independently of connectionless network layer protocols residing on each router, utilizing a next-hop tag exchange protocol to advertise the unique tags to neighboring routers. Preferably, the unique local tags are carried in a data link header of the packets.

In the illustrative embodiment, the tag database (TDB) further contains one or more remote tags which are facsimiles of local tags of neighboring routers. The remote and local tags are associated with is predetermined groups of destination addresses such as destination address prefixes. A forwarding information database (FIDB) is modified to include these tags to allow communications with nodes that do not support the novel arrangement.

As noted, neighboring routers exchange their local tags in accordance with the novel next-hop tag exchange protocol; this protocol is also used to update the router' respective databases with the remote (from the perspective of the receiver) tags.

The tag exchange protocol selectively updates the TDB with remote tags from neighboring routers that are reverse path forwarding (RPF) routers (i.e., a router along the optimal path to the associated end node). This provides the advantage of reducing the size of the TDB, reducing memory requirements and further reducing the time to make the next hop determination.

The packet forwarding arrangement comprises a packet forwarder that utilizes the local tags whenever possible to make the next hop determination for both unicast and multicast packets. If a received packet is a unicast packet containing a valid local tag, the packet forwarder preferably implements a novel exact match algorithm, searching the local tags of the TDB for the tag provided in the packet. In response to a match, the IP and SAP addresses of an optimal route are located and the remote tag associated with the next hop router is loaded into the data link layer header prior to forwarding the packet to the next hop router.

To prevent forwarding of duplicative multicast data packets, the packet forwarder forwards only the multicast packet received from RPF previous hop routers. The packet forwarder determines whether to forward or drop the packet by executing the exact match algorithm on the TDB with the remote tag and other address information necessary to uniquely identify the previous hop router. If the packet is not dropped, the local next-hop tag is placed in the packet and is forwarded to the next-hop router using existing multicast routing protocols.

If a valid tag is not provided in the unicast packet, the packet forwarder invokes a longest match algorithm to navigate the FIDB for a route associated with the destination address carried in the network layer header of the packet. The FIDB preferably comprises a conventional tree data structure for organizing the routing information. As with the case of a unicast packet, if a multicast packet does not contain a valid remote tag, the packet forwarder executes the longest match algorithm on the FIDB with the network layer source address to determine whether the previous hop router is an RPF neighbor.

Advantageously, the tag generation exchange are performed independently of presently-existing network layer protocols such as CLNP, IP and IPX. In addition, since the packet forwarding system transfers the local and remote tags in the data link layer header of the forwarded packet rather than using the network layer header, the applicable network layer protocols do not require modifications to exchange the routing information discussed above. Thus, the tag exchange protocol may operate in conjunction with the connectionless network layer protocols used in the router.

The present invention is implemented with a hierarchical tagging scheme having multiple levels of tagging corresponding to the hierarchical routing levels. By maintaining tags associated with routing levels, peer routers reduce the number of tags that they must maintain. This in turn, reduces the memory requirements of the packet forwarding system and increases the speed at which packets are forwarded. As a result, smaller routers may be used in applications that render large routers impractical or non-cost effective. This also enables the router to increase the number of nodes or domains it supports as the internetwork increases in size. Such sealeability is essential to supporting routing in large, graphically-distributed computer networks such as the Internet.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Internetwork Environment

Figure 3:
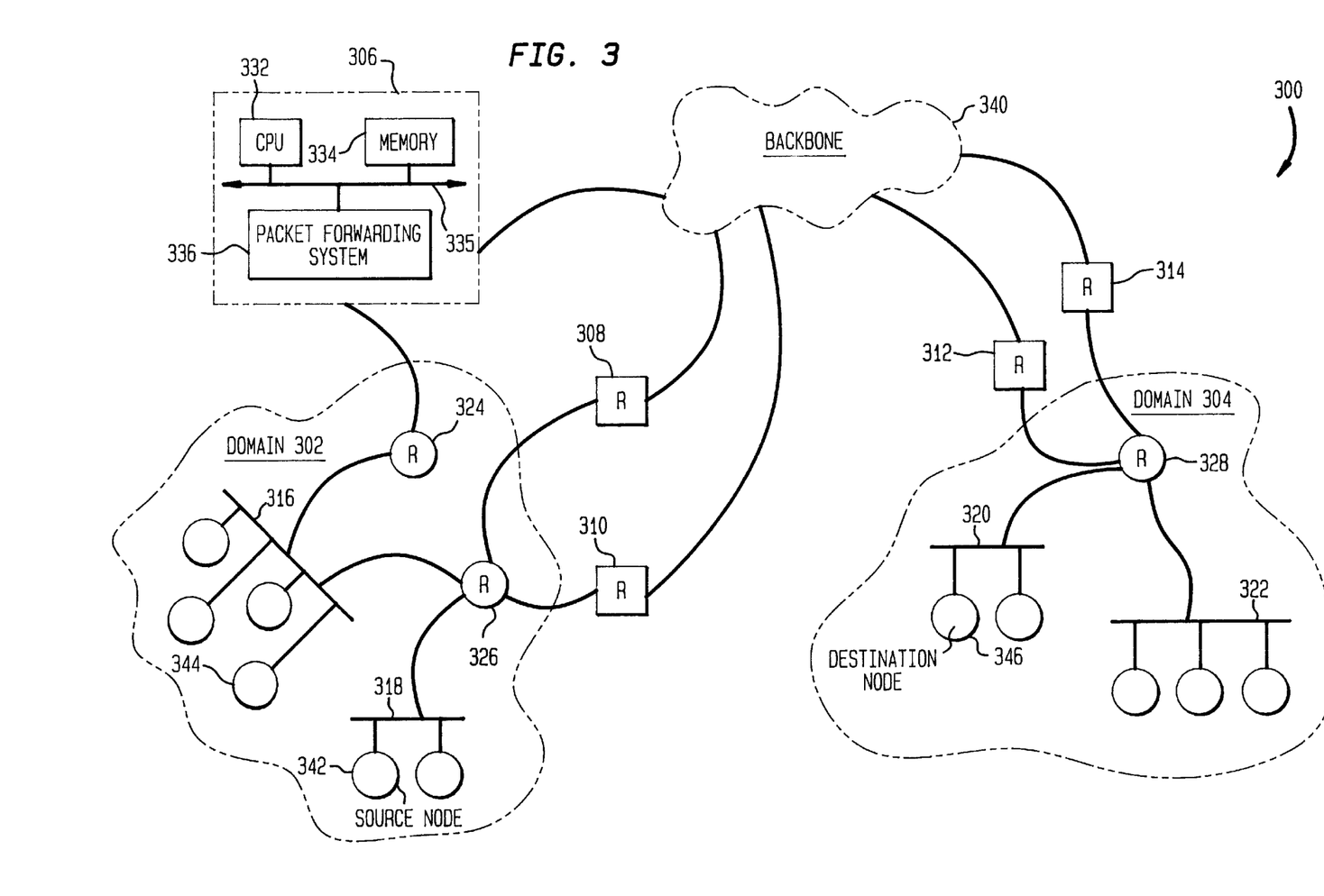
FIG. 3 is a block diagram of a computer internetwork including a collection of domains connected to a backbone via one or more routers implementing the novel packet forwarding system of the present invention.

FIG. 3 is a block diagram of an internetwork system 300 comprising a collection of domains 302–304 containing a number of local computer networks 316–322, each having one or more nodes, such as workstations and servers. The local networks are connected by intermediate nodes, such as intradomain routers 324–328 and interdomain routers 306–314 implementing the packet forwarding system of the present invention.

The routers are typically general-purpose computers, comprising a central processing unit (CPU) 332, a memory unit 334 and a packet forwarding system 336 of the present invention, interconnected by a system bus 335. The memory unit 334 may comprise storage locations typically composed of random access memory (RAM) devices, which are addressable by the CPU 332 and packet forwarding system 336. An operating system, portions of which are typically resident in memory and executed by the CPU 332, functionally organizes the node by, among other things, invoking network operations in support of processes executing in the CPU.

Intradomain routers 324–326 manage communications among local networks 316, 318 within domain 302 and communicate with each other using an intradomain routing protocol, such as RIP and IS—IS. Interdomain routers 306–314 connect domains 302 and 304 to the backbone 340 and communicate with each other using an interdomain routing protocol, such as IDRP, EGP and BGP routing protocols. Peer routers exchange (i.e., advertise) routing information with each other and maintain the routing information in a forwarding information database discussed below.

The routers include connectionless network layer protocols such as the connectionless network layer protocol (CLNP), the Internet Protocol (IP) network layer protocol and the Internetwork Packet Exchange (IPX) protocol. Connectionless network layer protocols exchange routing information with each other using neighbor greeting protocols such as ARP and ES-IS. This information is stored in the forwarding information database and used by the network layer protocols to determine paths through the internetwork 300.

Primarily, when an interdomain router receives a packet from a previous hop inter- or intradomain router, it determines the next hop inter- or intradomain router to which to forward the packet using the packet forwarding system 336 of the present invention. Similarly, intradomain routers forward packets between a previous hop interdomain router and the end nodes, making next hop determination using the packet forwarding system 336. For example, intradomain router 326 forwards packets originating at source node 342 to interdomain router 308, which then forwards the packet through backbone 340 to, for example, interdomain router 312, which then forwards the packet to intradomain router 328, which then finally transfers the packet to destination end node 346.

Packet Forwarding System

Figure 4:
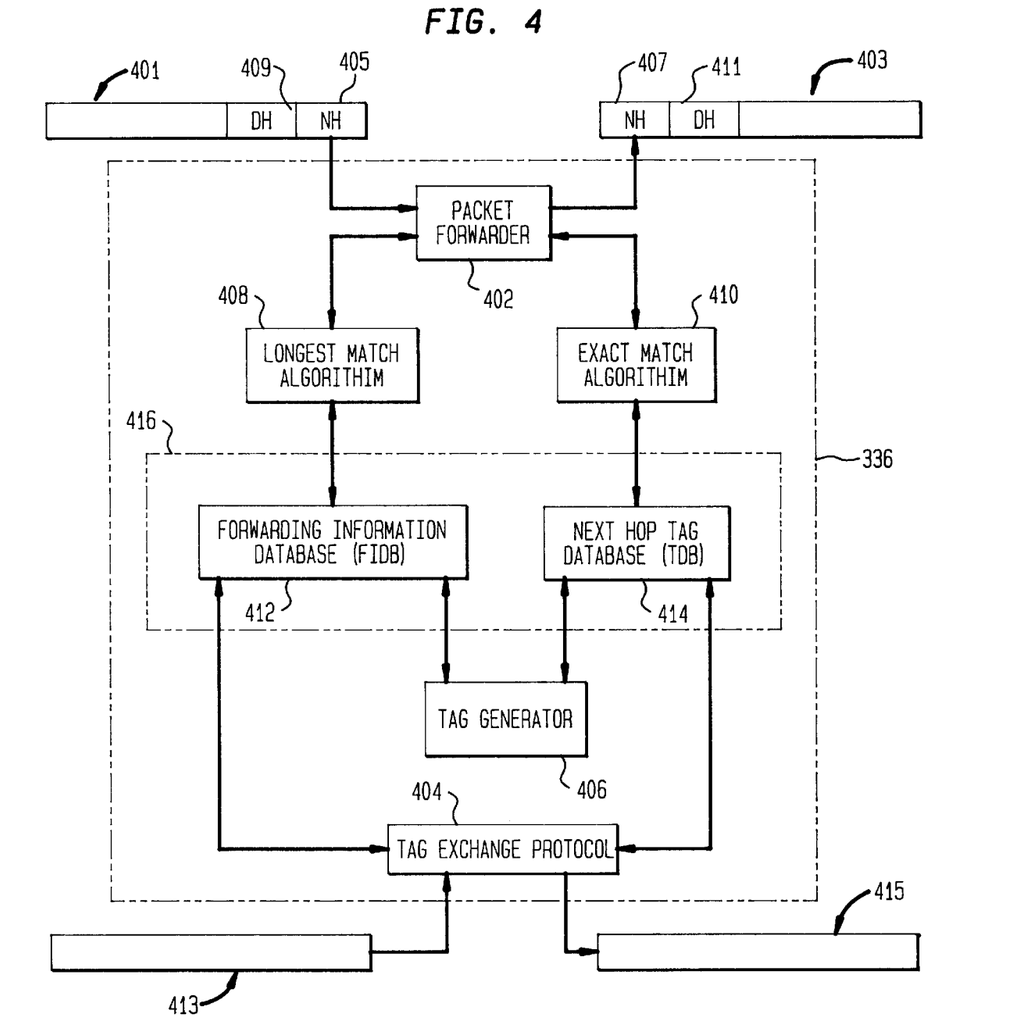
FIG. 4 is a functional block diagram of the packet forwarding system of the present invention.

FIG. 4 is a functional block diagram of the packet forwarding system 336 of the present invention. The packet forwarding system 336 is an improved packet forwarding arrangement for rendering fast and efficient routing, i.e., next hop decisions based upon unique local tags generated by routers of a network, and used as an index into a novel tag database to retrieve service access point (SAP) and next hop network layer addresses of the next hop node destined to receive a packet. The improved packet forwarding system operates independently of connectionless network layer protocols residing on each router, utilizing, next-hop tag exchange protocol to advertise the unique tags to neighboring routers. Preferably, the unique local tags are carried in a data link header of the packets.

The packet forwarding system includes two databases: a novel fast look-up tag database (TDB) 414 containing novel tags and associated routing information necessary to forward a packet to a next hop node, and an existing forwarding information database (FIDB) 412 modified to include the same tags and accessed when communicating with nodes not supporting the present invention.

The packet forwarding system 336 also includes a number of functional elements that operate with the above two databases for implementing the novel packet forwarding functions of the present invention. A tag generator 406 generates the local tags of the present invention; a tag exchange protocol 404 exchanges the local tags with neighboring nodes and updates the databases 412, 414 accordingly; and a packet forwarder 402 searches the databases 412, 414 to determine the next hop for a received data packet based upon information provided with the data packet.

Forwarding Information Database

The FIDB 412 contains route information associated with each network layer destination address accessible through the router 306. The FIDB 412 is the forwarding information database currently implemented in the router 306 to support the network layer protocol(s), modified to include the tags of the present invention. Accordingly, the FIDB 412 has a tree data structure and the packet forwarding system 336 implements a longest match algorithm 408 to navigate the FIDB 412.

As noted, the longest match algorithm 408 compares an increasing number of bits of the destination address with FIDB destination address prefixes as the algorithm navigates through the tree data structure of the database. The longest match algorithm 408 selects the FIDB entry having the longest, or most specific, address that matches.

Although conventional connectionless network layer protocols have a significant overhead due to the tree data structures implemented in the forwarding information databases as well as the number of destination address bits that must be matched by the longest matching algorithm to determine the next hop, the present invention implements the longest match algorithm 408 to search the FIDB 412 to, inter alia, maintain backwards compatibility with existing routers that do not support the present invention.

As noted, the FIDB 412 contains the novel tags of the present invention in addition to other network layer routing information. Thus, the FIDB 412 preferably contains, for each route accessible through the router 306, next hop node network layer and MAC addresses, destination address prefixes and data link layer SAP addresses for those destination addresses accessible on a link, and the local and remote tags of the present invention. Each of these is discussed in detail below with reference to the tag database 414.

Tag Database

To provide efficient packet forwarding performance, the tag database 414 does not have the same data structure as the forwarding information database 412, nor does the packet forwarding system 336 utilize the longest match algorithm to search the TDB 414. Instead, the tag database (TDB) 414 has a table look-up data structure and is indexed primarily by the small, fixed-length tags of the present invention. These features enable the packet forwarding system 336 to quickly and efficiently make next hop determinations, thereby significantly reducing the overhead associated with packet forwarding.

Figure 5:
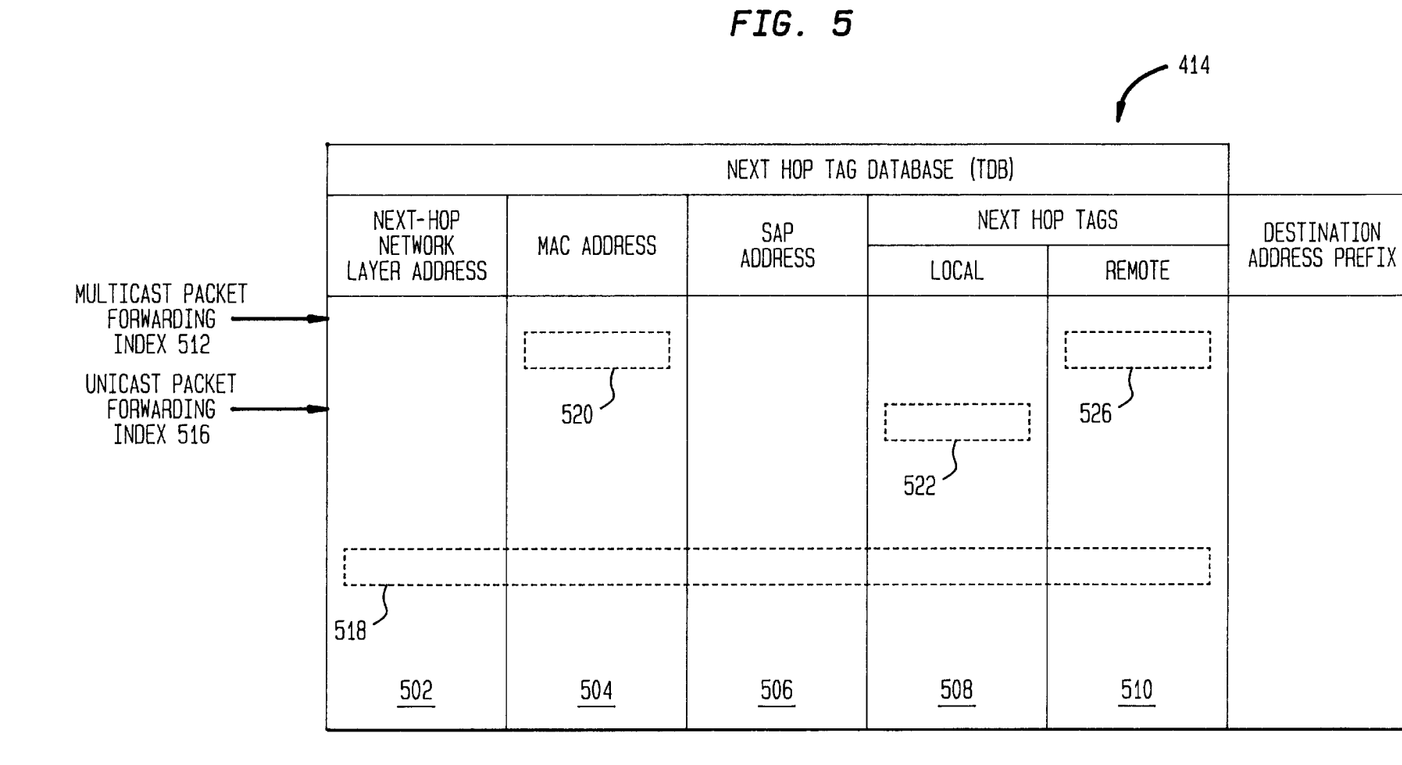
FIG. 5 is a block diagram of the tag database (TDB) of the present invention.

Referring to FIG. 5, the tag database 414 includes a network layer address 502, a MAC address 504, a SAP address 506, the local tag 508, and the remote tag 510. For reasons given below, the local tags 508 are preferably associated with the destination address prefixes. Thus, although they are not accessed by the present invention to make the determination, the destination address prefixes 528 are also illustrated in FIG. 5 to facilitate understanding.

The medium access control (MAC) address 504 is the address of the next hop router while the network layer address 502 is the address of the interface of that next hop router (e.g., the IP address). The service access is point (SAP) address 506 is the address of the data link layer protocol assigned to the internetwork link coupling the router with the next hop router identified by the MAC address 504.

The local tag 508 is a locally-unique fixed length value that is created by the tag generator 406 described below. In the preferred embodiment, each local tag 508 is associated with a destination address prefix 528. These local tags 508 and their associated destination address prefixes are provided to neighboring nodes for later inclusion in data packets forwarded to the router 306 intended for destination end nodes having a destination address included in the associated destination address prefix.

The remote tags 510 are tags that are local to neighboring node identified by the MAC address 504. Typically, a router has multiple neighboring nodes, all of which provide the router 306 with their locally-unique tag associated with a destination address prefix. Accordingly, there may be multiple remote tags 510 associated with each local tag 508. These remote tags 510 are received from neighboring routers through the tag exchange protocol 404 described below.

The TDB 414 has two indices: a unicast packet forwarding index 516 and a multicast packet forwarding index 512. The indices are used by the packet forwarder 402 to locate a route 518. Route 518 is a set of values 502–510 that identifies a path through the router 306. As noted, the destination address prefixes are not utilized by the packet forwarder 402 to determine the next hop, and are thus not included in route 518 as shown in FIG. 5. The unicast and multicast packet forwarding indices 516, 512 are described below.

It should be understood that other database arrangements are contemplated by the principles of the present invention and that the tag database 414 does not have to be implemented in the precise manner shown in FIG. 5. For example, instead of containing the next hop network layer and MAC addresses in the TDB 414 (and FIDB 412), a pointer to another location that contains these elements may be provided. More importantly, if the FIDB 412 has a data structure that may be navigated quickly by the indices of the present invention, then the FIDB 412 and the TDB 414 can be combined as illustrated by the dashed box 416.

Tag Generation

The tag generator 406 assigns a short, locally-unique, network layer-independent fixed length tag to predetermined groups of destination addresses that are accessible through the router 306. The tags are generated independently of existing network layer protocols as well as other nodes in the internetwork 300. Once generated, the tag is stored in a local tag component 508 associated with the destination address prefix 528 in the tag database 414.

As noted, in the preferred embodiment, each local tag 508 is associated with a destination address prefix 528. Thus, all destination addresses having the same destination address prefix are associated with the same local tag 508 by the tag generator 406. However, as would be apparent to one skilled in the relevant art, the local tags 508 may be associated with any user-defined group of one or more destination addresses. This ability to associate the local tags to desired source and/or destination addresses enables the present invention to provide any desired level of source/destination address granularity, from a single source/destination address pair to all the source addresses or groups of destination addresses. That is, a single local tag may be used to obtain routing information to forward any number of source and destination address pairs.

The tags 508 may be any length and may be generated in any known fashion. In the illustrative embodiment, for example, the local tag 508 is a sequentially-assigned number. However, the local tag may be generated randomly or in any other manner that results in a locally-unique value.

As noted, the reduction in overhead associated with the packet forwarding system 336 is achieved in part by the relatively small length of the tag values as compared with the destination addresses and their prefixes. Therefore, it is preferable that the tags have the smallest possible bit length necessary to identify the routes 518 that the router 306 must manage. This in turn, depends upon the size of the internetwork 300 as well the location of the implementing router (e.g., whether it is an inter- or intradomain router).

The generation of the locally-unique tag may occur at any time after a route is created in the FIDB 412 by existing network layer routing protocols. However, it is noted that tag generation should not be deferred needlessly since the novel processes and resulting benefits of the present invention are not available until the local tag 508 is created and exchanged with routing neighbors.

Significantly, the tags of the present invention are generated by the packet forwarding system 336 independently of the network layer protocols. This enables the present invention to be utilized in conjunction with, existing connectionless network layer protocols, such as CLNP, IP and IPX, enabling the present invention to be backward compatible.

Of the values assigned by the tag generator 406, there are two reserved values: a value that represents aggregation and null. Oftentimes, a router performs what is referred to as routing information aggregation, wherein several routes are combined into a single route, referred to as an aggregate route. When the packet forwarding system 336 advertises this aggregate route to its neighbors, the tag associated with the destination address prefix in the route will be set to the reserved aggregate value. If the FIDB 412 has a tree data structure, then the tag generator 406 may store a pointer to the aggregated route in the database.

Tag Exchange Protocol

Neighboring routers implementing the present invention exchange their locally-unique tags with each other, and update their respective FIDB 412 and TDB 414 databases with the received tag information. In the preferred embodiment, a novel tag exchange protocol 404 is implemented in the packet forwarding system 336 to facilitate this exchange and database update. Alternatively, currently existing network layer protocols may be modified to include the tag information with the routing information presently exchanged between router network layers.

The preferred tag exchange protocol 404 may be any commonly known protocol for advertising information to neighboring routers independently of any network layer protocols implemented in the router. For example, the separate tag exchange protocol 404 may be configured to be similar to currently existing protocols, such as IDRP and BGP. Significantly, however, the only information that is required to be provided to neighboring routers to support the present invention is the destination address prefix and its associated local tag. Furthermore, because the tags are completely "local," that is, they are stored and used only by the creating router and its neighbors, the tags are distributed over a single network layer hop (i.e., from one router to its neighbors). Thus, the tag exchange protocol 404 configured to effect the transfer of this information may be relatively simple as compared to existing routing information exchange protocols.

Importantly, the separate tag exchange protocol 404 is distinct from, and thus does not require modification of, presently-existing network layer protocols to include the tag information with the routing information currently exchanged between existing network layer routing protocols. Thus, the tag exchange protocol 404 may operate in conjunction with the connectionless network layer protocols existing in the implementing router.

The above exchange may be based upon any desired selection policies. For example, the tag exchange protocol 404 may monitor the usage of individual routes for forwarding. If a portion of the tags are advertised, then the tag exchange protocol 404 may prioritize the routes according to usage and exchanges the tag information for the most heavily used routes first. Alternatively, the tag exchange protocol 404 can advertise all of its tags to its neighbors, in which case no usage information is required to be maintained.

As noted, an alternative to a separate and independent tag exchange protocol 404 is to include the tag information in the network layer routing protocols currently used by the router to exchange routing information with its neighbors. Generally, there are two fundamental types of distributed routing algorithms: distance vector and link state. Network layer routing protocols are generally based upon one or the other.

Distance vector routing requires that each node maintain the distance from itself to each possible destination. The distances are interactively computed using information provided by neighboring nodes. Distance vector routing is used in, for example, RIP, IGRP and EIGRP. A derivation of distance vector routing, referred to as path vector routing, is used in BGP. The routing information that is exchanged between these network layer protocols includes a distance vector and destination address prefix. The protocols may be easily modified to also include the local tag associated with the destination address prefix. Such a modification of these network layer protocols is considered to be obvious to those skilled in the relevant art.

In link state routing, each router constructs a packet referred to as a link state packet (LSP) containing a list of its neighbors and an associated cost of using the next link path to those neighbors as the next hop. Upon receipt of a neighbor's LSP, each router computes a route to each destination. Link state protocols include, for example, the IP open shortest path first (OSPF) link state routing protocol and the ISO Intermediate System-to-Intermediate System (IS—IS) routing protocol. In OSPF, the Opaque LSA (link state advertisement) packet configured with a link-local scope may be used to carry the tags associated with the route.

When a router receives the tag information from a neighboring router, it determines if that neighboring router would be selected as the next hop router to destination addresses covered by the route. If so, then the router considers the received tag to be a "remote" tag since it is local to the neighboring router, and stores it as such in the TDB 414 and FIDB 412. This selective storage of tag information in the FIDB 412 and TDB 414 enables the present invention to maintain only the necessary information in the databases so as to reduce the overhead associated with forwarding the packet.

In addition to exchanging the local tag information, the tag exchange protocol 404 can be configured to perform other supporting functions such as ensuring the reliable exchange of information by, for example, transmitting an acknowledgment to the forwarding router in response to the receipt of the exchanged tag information.

Furthermore, in addition to exchanging (i.e., advertising) the above-noted tag information, when a router performs route aggregation, the tag exchange protocol 404 may be configured to selectively advertise the remote tags of the aggregated routes to certain routing neighbors, thereby enabling the aggregating router to use the exact match algorithm 410 on those packets destined for the aggregated routes, further reducing the use of the longest match algorithm 408.

Packet Forwarding

The packet forwarding system 336 utilizes the tags of the present invention when available to make a next hop determination. For reasons provided below, the tag 508 is preferably contained in the data link header 409 of the data packet 401.

Upon receipt, the packet forwarder 402 determines whether the data packet is a unicast or multicast data packet. In the preferred embodiment, this information is provided in the data link layer header 409. Alternatively, the packet forwarder 402 will retrieve such information from the network layer destination address.

If the packet 401 is a unicast packet, the packet forwarder 402 implements the exact match algorithm 410 on the TDB 414 with the packet's tag or, if a valid tag is not included in the packet 401, the longest match algorithm 408 on the FIDB 412 with the network layer destination address. If a remote tag for the next hop is found during either of these searches, it is forwarded to the next hop node.

If the packet 401 is a multicast packet, the packet forwarder 402 determines whether it should forward or drop the packet based upon the identity of the previous hop router. Oftentimes, a router will have more than one previous hop router providing it with the same multicast packet originating from a particular source end node. Only one of these previous hop routers is along an optimal spanning tree originating at the source end node. This router is referred to as the reverse path forwarding (RPF) router. To prevent unnecessary processing of such duplicative multicast data packets, the packet forwarder 402 drops all multicast data packets that are forwarded from non-RPF previous hop routers. To make this determination, the packet forwarder 402 preferably executes the exact match algorithm 410 on the TDB 414 with the multicast packet forwarding index 512. If the packet does not contain a valid tag, the packet forwarder 402 executes the longest match algorithm 408 on the FIDB 412 with the source address. If the previous hop router is an RPF neighboring router, then the packet forwarder 402 forwards the packet; otherwise the packet is dropped.

Preferably, the tag is stored in the data link layer header 409 of the packet 401. As noted, the data link layer header 409 is specific to different data link layer protocols. Each of the data link layer headers, however, offer facilities for transporting data such as the tag of the present invention. Accordingly, each data link header 409,411 must be modified. Such modification of the data link layer header is considered to be obvious to those skilled in the art. For example, if the router 306 provides frame relay services, the tag may be included in the data link connection identifier (DLCI) field. Alternatively, if the router 306 provides Ethernet services, then a separate data link layer header may be created specifically to carry the tag. It is understood that other data link layer protocols are anticipated by the principles of the present invention.

Utilizing the data link header 409 rather than the network layer header 405 to transport the tag, the present invention may be implemented independently of, and can be utilized in conjunction with, existing connectionless network layer protocols, such as CLNP, IP and IPX. In other words, the present invention may be implemented in existing routers without requiring modifications of the network layer protocols resident in the router. Furthermore, the ability to operate concurrently with existing network layer protocols contributes to the present invention's ability to be backward compatible. That is, the present invention may be introduced gradually into an internetwork system 300, maintaining operability with both existing network routers.

Figure 6:
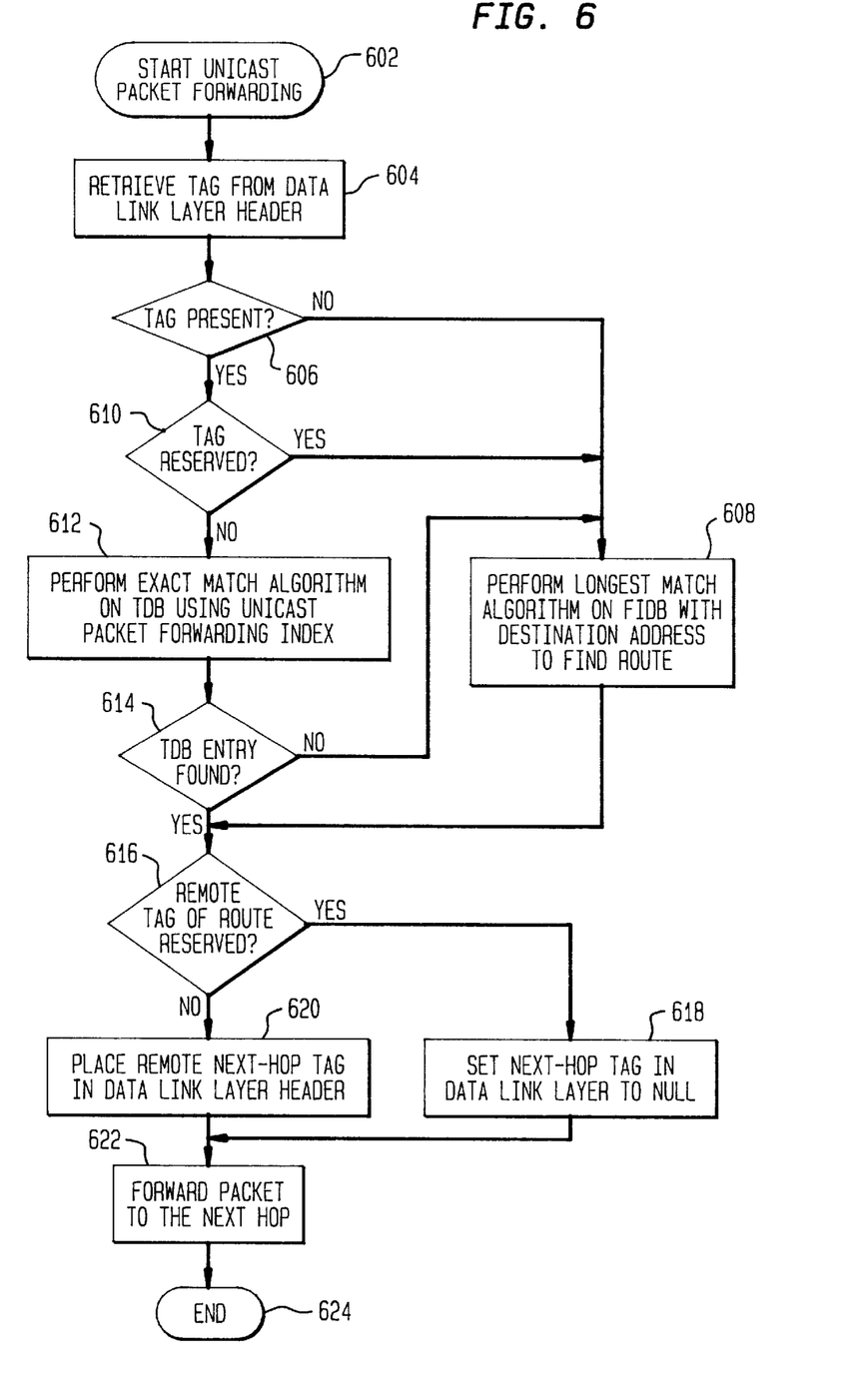
FIG. 6 is a flowchart of the unicast packet forwarding process of the present invention.

FIG. 6 is a flow chart of the unicast packet forwarding process 600 performed by the packet forwarder 402 when the packet 401 is a unicast data packet. The process begins at block 602 and proceeds to block 604 where the tag is retrieved from the data link header 409 of a received data packet 401.

At decision block 606, the packet forwarder determines whether the data link layer header 409 contains a tag. As noted, the present invention may receive packets from previous hop nodes that do not support the present invention. Under such conditions, the received packet will not include a tag. In this case, the packet forwarder 402 invokes the longest match algorithm 408 at block 608. The longest match algorithm 408 searches the FIDB 412 for a route associated with the destination address carried in the network layer header 405 of the packet 401. When the longest match is found, the remote tag 510 associated with the found route 518 is retrieved from the FIDB 412.

If the data link header 409 contains a tag, then processing continues at decision block 610 wherein the packet forwarder 402 determines whether the packet's tag is reserved. Since a null or aggregate tag cannot be used to determine the next hop, the packet forwarder 402 executes the longest match algorithm 408 at block 608 as described above.

When the received data packet 401 contains a non-reserved tag, the packet forwarder 402 invokes the exact match algorithm 410 at block 612. The exact match algorithm 410 searches the TDB 414 using the unicast packet forwarding index 516. Significantly, the unicast packet forwarding index 516 includes only the local tag 508 as shown by dashed box 522 in FIG. 5. When a data packet having a valid tag is received, the packet forwarder 402 searches the TDB 414 using the unicast forwarding index 516 to find a route 518 for forwarding the data packet to a next hop node.

If at decision block 614 it is determined that the exact match algorithm 410 did not locate a local tag 508 in TDB 414 that matches the packet's tag, the packet forwarder 402 executes the longest match algorithm 408 at block 608 as described above. The TDB 414 will not have a tag 522 under conditions such as when the router 306 has not yet received some or all of the tags from the previous hop router. Alternatively, the tag exchange protocol 404 may not store all the tag information it received from its neighboring nodes in the FIDB 412 and TDB 414.

After the execution of either the longest match algorithm 408 or the exact match algorithm 410, the remote tag associated with the found route is read at block 616 to determine whether it has a reserved value. If so, it cannot be used by the next hop node; accordingly, the tag in the data link layer header 411 of data packet 403 is set to null. However, if a non-reserved remote tag is found in the searched database, then at block 620 the remote tag is placed into the data link layer header 411. The data packet 403 is then forwarded to the next hop node, as specified by the retrieved route, at block 622, after which the process ends at block 624.

As noted, the local tag may be assigned an aggregate reserved value. To optimize the unicast packet forwarding process 600, TDB 414 entries that have a local tag 508 with the reserved aggregate value include a pointer to the FIDB 412 where the route associated with the entry is located. This reduces the number of instructions required to perform the longest match algorithm 408 at block 608 since the algorithm would not begin navigating the tree data structure from the top, but from one of the intermediate nodes instead.

Figure 7:
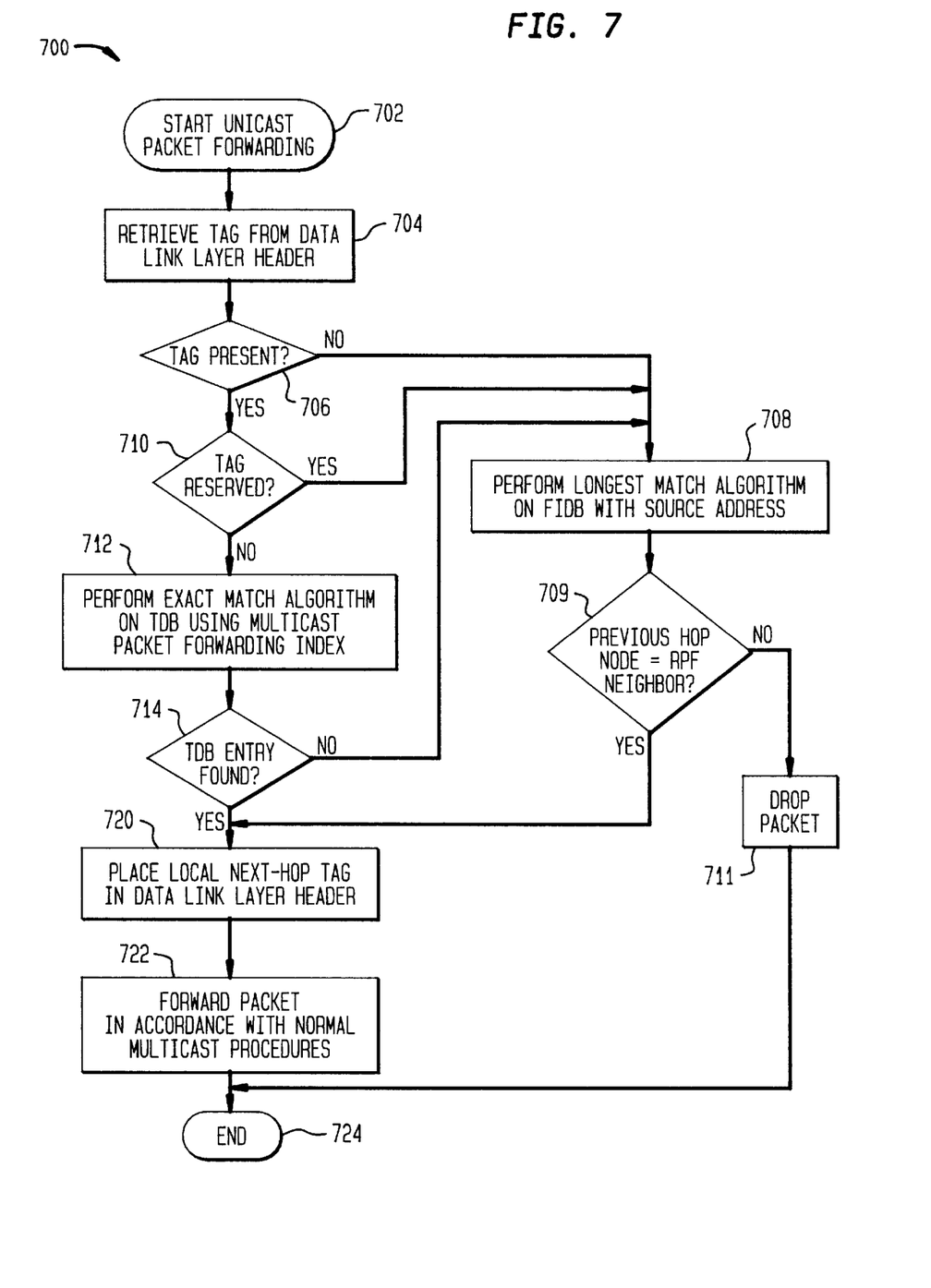
FIG. 7 is a flowchart of the multicast packet forwarding process of the present invention.

FIG. 7 is a flow chart of the multicast packet forwarding process 700. Network layer protocols generally make two determinations when a multicast data packet is received. First, as noted above, a determination as to whether to forward or drop the packet must be made. If the packet is not dropped, then a determination as to which links onto which the packet is to be forwarded must then be made. This second determination is controlled by existing multicast routing protocols operating at the network layer, such as the IP Protocol Independent Multicast (PIM) protocol. This determination is considered to be well known to those skilled in the art and is beyond the scope of the present invention.

The first determination, however, is performed by conventional systems utilizing the forwarding information database and longest algorithm, and are subject to the associated drawbacks described above. The packet forwarding system 336 optimizes this determination by utilizing is the tags and TDB of the present invention.

The process 700 begins at block 702 once it is determined that the packet 401 is a multicast data packet, and proceeds to block 704 where the tag is retrieved from the data link header 409 of the packet 401.

If it is determined that the data link layer header 409 does not contain a tag at block 706 or if the retrieved tag is reserved (block 710), then processing continues at block 708. At block 708 the packet forwarder 402 executes the longest match algorithm 408 on the FIDB 412 with the network layer source address to determine whether the previous hop router is an RPF neighbor.

To make this determination, the longest match algorithm 408 is implemented to search for a destination address equivalent to the source node address in the network layer 405. When a route is found in the FIDB 412, the packet forwarder 402 retrieves the next hop network layer address from the FIDB 412 and compares it to the corresponding value in the packet 401. If these addresses are the same, then the previous hop router that has forwarded the multicast data packet 401 to this router is the router that this router uses to forward a data packet to the source node address, i.e., it is an RPF neighbor. The packet forwarder 402 then inserts the local (its own) tag in the data link layer header 411 at block 720 and forwards the packet in accordance with normal multicast procedures at block 722. Processing then ends at block 724.

If these addresses are not the same, then the data packet 401 was forwarded from a non-RPF neighbor and the packet is dropped at block 711, after which the process is completed at block 724.

If the packet 401 contains a tag (block 706) that is not reserved (block 710), then processing continues at decision block 712 wherein the packet forwarder 402 invokes the exact match algorithm 410 on the TDB 414 with the multicast packet forwarding index 512. The multicast packet forwarding index 512 is a concatenation of the remote tag 510 and the MAC address 504 as shown by dashed boxes 526 and 520, respectively. When there are multiple previous hop routers interfaced to a particular router, multicast data packets intended for the same destination end node include the same tag values since the particular router previously supplied its local tag 508 to the previous hop routers.

If the packet forwarder 402 treated these packets the same manner as unicast packets, it would search the TDB 414 for the local tag and forward the multicast packets accordingly. However, such an approach would result in the needless transmission of duplicative multicast data packets. To avoid this, the packet forwarder 402 of the previous hop router forwards the tag 510 that is local to itself rather than the tag that is local to the next hop router. This enables the packet forwarder 402 of the next hop router to select which multicast data packet to forward based upon the remote tag 510 of the multicast packet forwarding index 512.

Unfortunately, this is insufficient information for the packet forwarder 402 to uniquely identify the previous hop router. The multiple previous hop routers may be interfaced to the same link of a particular router, in which case data packets arriving at that link interface (i.e., router port) will arrive at the network layer through the same service access point (SAP) address regardless of which of the previous hop routers forwarded it. Furthermore, since each node assigns its local tags independently of all other nodes, the tags assigned by two previous hop routers to a destination address prefix may have the same value. In this case the TDB 414 will have two identical remote tags 510 associated with the same local tag 508. As a result, the multicast packet forwarding index 512 also includes the MAC address 504 to enable the packet forwarder 402 to accurately determine the previous hop node.

However, it should be obvious to those skilled in the relevant art that other means for accurately identifying the previous hop router may be used. For example, if a router input interface allows for the unambiguous identification of the previous hop router, the multicast packet forwarding index 512 may include the SAP address 506 rather than the MAC address 504.

If at decision block 714 it is determined that the exact match algorithm 410 did not locate a route 518, then the packet forwarder 402 executes the longest match algorithm 408 at block 708 as described above to verify that the previous hop router is not an RPF neighbor. Processing continues as noted above. Otherwise, a TDB route 518 was located, is indicating that the previous hop router is an RPF neighbor. The local tag 508 associated with the found route is placed into the data link layer header 411 and the data packet 403 is forwarded to the next hop node in accordance with normal multicast procedures at block 722. Processing then completes at block 724.

Thus, the packet forwarder 402 optimally makes a next hop determination for multicast data packets, forcing multicast traffic to follow a path which is rooted at the source end node and eliminating duplicative multicast traffic.

Multiple Tagging Levels

The packet forwarding system 336 is preferably implemented with multiple tagging levels. As noted, internetwork 300 is a hierarchically-arranged distributed internetwork system. The internetwork 300 contains levels of subnetworks, each having an associated routing level. A first level of subnetworks includes routing domains 302–304, wherein routers 324, 326 and 328 manage individual links and nodes within their respective domains. A second routing level is concerned with all the first level subnetworks, but does not address the details internal to the first level networks. This routing level includes interdomain routers 306–314.

The present invention contemplates the implementation of a hierarchical tagging scheme having levels of tagging corresponding to the hierarchical routing levels. In the illustrative embodiment illustrated in FIG. 3, there are interdomain tags exchanged between only the interdomain routers 306–314 and not the intradomain routers 324–328, and intradomain tags that are exchanged among all routers. In the intradomain routers these tags are treated as the local tags described above. The interdomain routers, however, will have a tag database that includes both levels of tags.

When an interdomain router 306 receives a route from a network layer protocol of another interdomain router such as router 314, the tag generator 406 creates the tag in a manner determined by whether the next hop information provided in the packet. The next hop information may be provided explicitly (e.g., in the BGP protocol there is a next_hop attribute provided in the distance vector) or implicitly wherein the network layer address of the router itself is used as the next hop. In either case, if the next hop is an interface on the interdomain router 306, then the packet forwarder 402 places the local tag in the data link layer header. However, if the next hop is an intradomain router, then the packet forwarder 402 of router 306 places the remote tag of the previous hop interdomain router. The tag exchange protocol 404 advertises this tag information to all neighboring intradomain routers.

The multiple levels of tagging reduces the number of tags that interdomain routers must maintain to less than those of interdomain routers. This in turn, reduces the memory requirements of the packet forwarding system 336 as well as increase the speed of the packet forwarding process. This in turn enables smaller routers to be is implemented where heretofore, large routers were not practical or cost effective.

This enables a router implementing the packet forwarding system 336 of the present invention to grow with the number of nodes in the domain or internetwork. Such scaleability is essential to supporting routing in large, graphically-distributed computer networks such as the Internet.

Another advantage of multiple levels of tagging is that it provides isolation between intra- and interdomain routers. Intradomain routers, for example, do not have to maintain routing information utilized by interdomain routers, and thus are not affected by changes in the external routing.

While there has been shown and described an illustrative embodiment for implementing a packet forwarding system that quickly and efficiently renders forwarding decisions for packets forwarded through a high-performance router on the basis of locally-unique tags stored in a fast look-up database, it is to be understood that various other adaptations and modifications may be made within the spirit and scope of the invention. For example, the novel packet forwarding system may be implemented in end nodes, enabling source nodes to provide intradomain routers with their local tag in the packet data link headers.

The foregoing description has been directed to specific embodiments of this invention. It will be apparent, however, that other variations and modifications may be made to the described embodiments, with the is attainment of some or all of their advantages. Therefore, it is the object of the appended claims to cover all such variations and modifications as come within the true spirit and scope of the invention.

What is claimed is:

1. A packet forwarding system for efficiently forwarding a data packet through a router, the data packet received from a previous hop node and forwarded to a next hop node of an internetwork, the system comprising:

a tag database containing, for predetermined groups of one or more destination addresses, one or more unique local tags and one or more remote tags, each remote tag being unique to another node, separate from the router, one said remote tag being unique to said next hop node;

a tag exchange protocol means for exchanging said local tags with said other nodes independently of receipt of requests therefor from said other nodes and for updating said tag database with said one or more remote tags received from said neighboring nodes; and a tag forwarder for implementing an exact match algorithm to search said tag database for a local tag that matches a tag provided in the packet, and for forwarding the packet to the node identified by routing information associated with said matching local tag.

2. The system of claim 1, wherein said predetermined groups of said one or more destination addresses are grouped in accordance with destination address prefixes.

3. The system of claim 2, wherein said local and remote tags are fixed-length tags having a minimal bit length to uniquely identify each of said one or more destination address prefixes stored in said TDB.

4. The system of claim 2, wherein the packet does not contain a valid tag, the system further comprising:

a forwarding information database (FIDB) containing said destination address prefixes, said local and remote tags and said routing information; and a longest match algorithm configured to search said destination address prefixes of said FIDB, wherein said packet forwarder implements said longest match algorithm to search said destination address prefixes of said FIDB for a destination address carried in a network layer header of the packet and for forwarding the packet to the router identified by said routing information.

5. The system of claim 2, wherein the packet is a multicast packet, and further wherein said packet forwarder forwards the packet only when said previous hop node is a reverse path forwarding previous hop node.

6. The system of claim 5, wherein the received multicast packet contains a remote tag unique to the previous hop node, said packet forwarder executing said exact match algorithm on said TDB with said received remote tag.

7. The system of claim 5, wherein the received multicast packet does not have a valid tag and having a network layer header including network layer destination and source addresses, the packet forwarder executing said longest match algorithm on said FIDB with said source address to determine whether said previous hop router is an RPF neighbor.

8. The system of claim 1, wherein said local and remote tags are transferred in a data link layer header of the forwarded packet.

9. The system of claim 1, wherein said local and remote tags are arranged in a hierarchical tagging scheme having multiple levels of tagging corresponding to the hierarchical routing levels, wherein peer routers maintain tags associated with their routing level, reducing the number of tags that certain routers must maintain.

10. In an internetwork having two or more local networks interconnected by one or more routers, a method for forwarding packets in a router from a previous hop node to a next hop node, comprising the steps of:

(a) creating a tag database containing, for predetermined groups of one or more destination addresses, one or more router-unique local tags and one or more remote tags, each remote tag being unique to another node, separate from the router, one said remote tag being unique to said next hop node;

(b) providing said one or more local tars to the previous hop node independently of receipt of requests therefor from the previous hop node;

(c) receiving a data packet generated by the previous hop node, the data packet including a data link layer header having one of said one or more local tags and a network layer header having source and destination addresses;

(d) searching said tag database for a tag for replacing said tag in the packet; and (e) forwarding the packet to the next hop node.

11. The method of claim 10, further comprising the step of:

(e) prior to said step (b), providing said one or more local tags with the previous hop node.

12. The method of claim 11, further comprising the steps of:

(d) prior to said step (c), receiving at least one of said one or more remote tags from said next hop node; and (e) updating said tag database with said received remote tags.

13. The method of claim 12, wherein the packet does not contain a valid tag, the system comprising a forwarding information database (FIDB) containing said destination address prefixes, said local and remote tags and routing information, the method further comprising the steps of:

(f) searching said destination address prefixes of said FIDB with a longest match algorithm for said destination address of the packet.

14. The method of claim 10, wherein said packet is a unicast packet containing a local tag unique to the router, wherein said step (c) comprises the step of:

(1) searching said next hop database for a local tag that exactly matches said local tag included in said packet; and (2) replacing said local tag in the packet with a remote tag associated with the matching local tag.

15. The method of claim 10, wherein the packet is a multicast packet, and further wherein said step (e) is performed only when the previous hop node is a reverse path forwarding previous hop node.

16. The method of claim 15, wherein said multicast packet contains a remote tag unique to the previous hop node, wherein said step (c) comprises the steps of:

(1) searching said next hop database for a remote tag and MAC address that exactly matches said remote tag and an associated MAC address included in said packet; and (2) replacing said remote tag in the packet with said local tag associated with said matching remote tag in the TDB.

17. The method of claim 10, wherein said local and remote tags are transferred in a data link layer header of the forwarded packet.

18. The method of claim 10, wherein said local and remote tags are arranged in a hierarchical tagging scheme having multiple levels of tagging corresponding to the hierarchical routing levels, wherein peer routers maintain tags associated with their routing level, reducing the number of tags that certain routers must maintain.

19. For operating a router to forward data packets, a method comprising the steps of:

A) providing the router with a forwarding table that includes a plurality of forwarding-table entries, each of which is identified by a respective local tag and specifies a next hop node and at least one remote tag;

B) providing one or more of said local tags to a previous hop node independently of receipt of requests therefor from the previous hop node; and C) in response to the router's receipt from the previous hop node an input data packet including a network-layer payload and a network-layer header to which is prepended a header containing an input one of said local tags:

i) generating an output packet containing the network-layer payload and a network-layer header to which is prepended a field containing a remote tag specified by the forwarding-table entry that the input local tag identifies; and ii) forwarding the output packet to the next hop node specified by the forwarding-table entry that the input local tag identifies.

* * * * *